Dec. 28, 1965     J. A. FADY     3,225,429
METHOD OF MAKING AND APPLYING STOCK
CHAIN FOR SLIDE FASTENERS
Original Filed Dec. 2, 1960     3 Sheets-Sheet 1

INVENTOR
JEAN ANDRÉ FADY

BY

ATTORNEY

Dec. 28, 1965  J. A. FADY  3,225,429
METHOD OF MAKING AND APPLYING STOCK
CHAIN FOR SLIDE FASTENERS
Original Filed Dec. 2, 1960  3 Sheets-Sheet 2
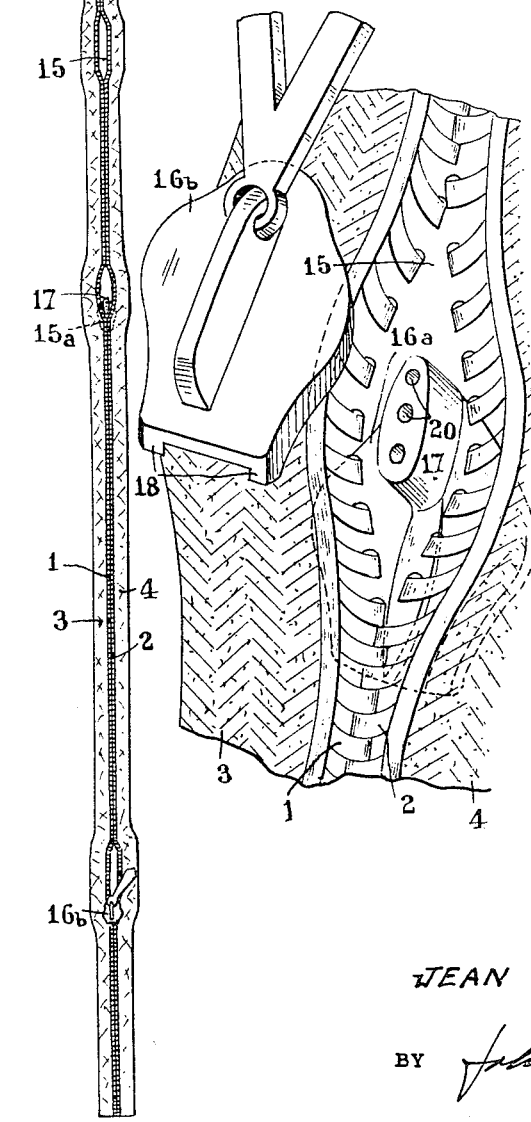
INVENTOR
JEAN ANDRÉ FADY
BY
ATTORNEY.

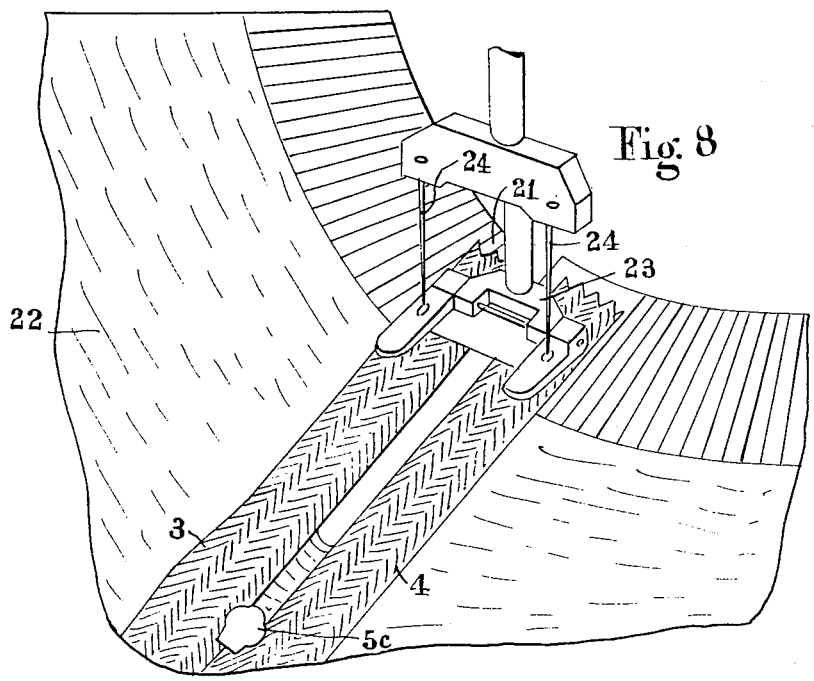

3,225,429
METHOD OF MAKING AND APPLYING STOCK CHAIN FOR SLIDE FASTENERS

Jean André Fady, Brunoy, France, assignor to Societe Francaise de Fermetures de Luxe, Choisy-le-Roi (Seine), France, a corporation of France
Original application Dec. 2, 1960, Ser. No. 73,311, now Patent No. 3,149,927, dated Sept. 22, 1964. Divided and this application June 22, 1964, Ser. No. 376,692
Claims priority, application France, Dec. 11, 1959, 812,752
1 Claim. (Cl. 29—408)

The present invention relates to a method of making fasteners of the type composed of two stringers each consisting of an elongated tape carrying a series of hooking members or fastener elements adapted to be connected or disconnected with the series of elements on the other stringer by means of a slider.

This application is a division of my application Serial No. 73,311, filed December 2, 1960, for Stock Chain for Slide Fastener and on which issued Patent No. 3,149,927 dated September 22, 1964.

Slide fasteners of the indicated type are required in many different lengths for knitwear, hosiery and like articles, and also for clothing, bags, pockets, briefcases, etc., and accordingly, it has heretofore been necessary to manufacture and stock these fasteners in many different lengths. In making such fasteners it has been the practice to first manufacture the stringers in the form of a chain or strip consisting of two endless registered series of hooking members secured on two supporting tapes. This chain or strip is then divided into sections having the different desired lengths and which are provided with a slider and with stop means at their ends. This method of manufacture necessarily involves several successive steps, such as cutting the chain into sections, fitting stop-forming staples on one end of each section, locking these staples to the section by means of tongs if the device comprises rows of plasic hooking members, poitioning a slider on each section, fitting stop-forming staples at the other end of the section, and locking these staples in place by means of tongs.

In addition to these complementary steps it is necessary to pack and stock separately the different groups of fasteners thus manufactured. For their subsequent use, that is, for securing the chain sections on garments and other articles, it is necessary to select the desired lengths from the groups of fasteners having different lengths.

As the number of these groups supplied to the trade is not very high in order to avoid complicating unduly the stocking conditions, the manufacturers of hosiery, knitwear, clothing and other articles must constantly take inventory of the number of lengths available for the articles being manufactured and this obviously is not always easy. This requirement is especially difficult in the mass production of clothing and other articles.

It is the primary object of this invention to provide for the users, notably the manufacturers of knitwear, hosiery and other articles utilizing slide fasteners in large numbers, long stock fastener chains or strips from each of which a plurality of slide fasteners of any desired length may be prepared without difficulty.

In accordance with the invention, the stock fastener chains or strips are wound on spools or the like to simplify handling, transport and stocking operations and such strips are subsequently unwound and cut into sections of any desired lengths to provide as they are needed complete slide fasteners adapted to be secured immediately on any desired object, for example clothing articles during their manufacture.

To accomplish the aforesaid objects, the present invention provides a stock chain or strip consisting of two series of hooking members or fastener elements carried by a pair of registering supporting bands or tapes, and characterized in that these two series of hooking or fastener members constitute together a continuous slideway and in that two or more sliders disposed in the same direction are mounted on said slideway; all the hooking members disposed between any two adjacent sliders being either interconnected, except those located in close proximity of the wide end of one of the sliders, or disconnected from one another, except those located in close proximity of the narrow end of the slider.

In order to permit the use of the chain of this invention for forming slide fasteners of any desired lengths without difficulty, it is necessary that the sliders be constructed to enable them to connect the two series of hooking members of the chain in interengaged relation in both directions of movement of these sliders. Under these conditions the chain must consist either of metal hooking members adequately shaped to this end, or of plastic members separate from one another or consisting of a suitably shaped section, such plastic members being adapted to be re-assembled by the narrow end of the slider, even when the latter is moved in the direction opposite to that of its normal closing movement.

The number of sliders engaged on a chain of any length may be selected as a function of the number of sections to be cut therefrom. It is also possible to dispose the sliders by groups at several locations selected at will on the chain. As already explained this chain may be wound on a spool or the like and then unwound for its actual use. With this chain, mass-produced garments and clothes can very easily be equipped with slide fasteners of any desired lengths. In fact, in such assembly it is sufficient to unwind the chain carried by the spool or the like, then cut the same into sections having the approximate length desired for the article in which it is to be incorporated, and then sew or otherwise secure such approximate sections on the garments during their manufacture. When the approximate sections of the fastener are being incorporated in the garments or other articles being manufactured, they are cut to the desired lengths required for the particular garments or articles being manufactured. It will be evident that this specific or desired length of the fastener may differ considerably from the initial approximate length of the fastener. In the practice of these operations, it will be noted that the aforesaid preliminary operations which are now employed in assembling slide fasteners on articles, are eliminated, and therefore the stocking and fitting of slide fasteners on mass-produced articles and the selection of any desired length is facilitated considerably.

In accordance with another object of the invention there is provided a novel method of securing sections of slide fastener chain or strip made according to this invention and as broadly set forth hereinabove on clothing, hosiery, knitwear, underwear, leather and other articles.

It is a further object of this invention to provide a specific method of preparing a continuous chain of interengageable hooking members of the type set forth in the preceding paragraphs.

Other objects, as well as the advantages of the invention, will become apparent from a perusal of the following description when read in conjunction with the accompanying drawings, in which FIG. 1 is a fragmentary plane view of a portion of a chain or strip made in accordance with this invention and from which slide fasteners may be manufactured;

FIG. 6 is a plane view of the chain of this invention during its manufacture according to a specific method;

FIG. 7 is a perspective view showing on a different larger scale the method of securing a slider to the chain in carrying out the method illustrated in FIG. 6; and FIG. 8 is a perspective view showing a specific method of securing a chain section of this invention;

Figure 3:
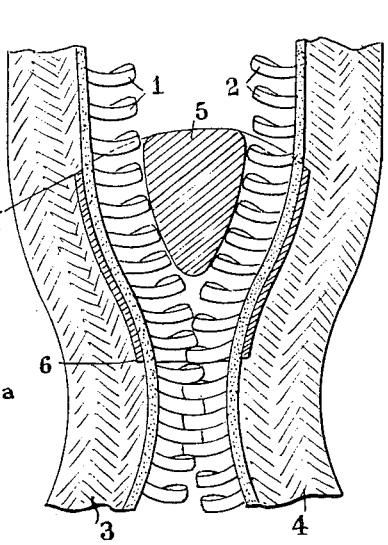
FIG. 3 is a fragmentary plane view showing on a larger scale the relation of the chain hooking elements adjacent to a slider.

A slide fastener chain made in accordance with this invention comprises two series of complementary hooking members or locking elements 1, 2 registering with each other in interlocked relation and carried by the opposed edges of two supporting tapes or bands 3, 4, respectively, of usual construction. These hooking members may consist, as in the example illustrated, of separate fastener elements of usual construction, secured separately on the tape. If desired, the members in each series may be formed of a continuous piece of wire or of sections of wire and of suitable cross-sectional contour to enable such continuous wire piece or wire sections to be secured on the associated supporting tape. The fastener members may be made from any suitable metal or plastic material. Mounted on the chain are a plurality of sliders 5, 5a, 5b, of conventional design and of a known construction enabling them to be moved in either direction on the chain. As is usual, the narrow end 6 of each slider maintains the associated hooking members 1 and 2 located in such end in their interconnected condition, while the opposite wider end 7 of each slider separates the hooking members 1, 2 contained therein so that they are spaced apart from each other in the transverse direction (note FIG. 3).

Figure 1:
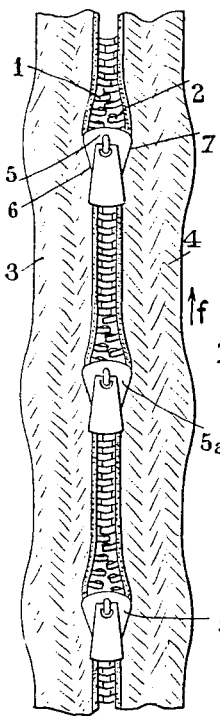

According to an essential feature of this invention, all the sliders 5 of a chain are oriented in the same direction, that is, their narrow ends 6 face the same end of the chain. Thus, each slider closes the chain when it is moved in the direction of the arrow f in FIG. 1, and opens the chain when it is moved in the opposite direction.

Moreover, the sliders are so engaged on the chain that substantially all the hooking members 1, 2 are interconnected in their closed position between two adjacent sliders, except a few ones in close proximity to the wide ends 7 of the sliders. In the chain illustrated in FIG. 1, two or three hooking members remain thus disconnected in close vicinity of the end 7 of each slider.

Figure 2:
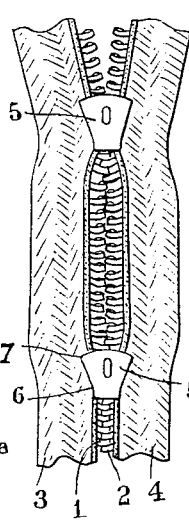
FIG. 2 is a similar view showing another possible form of embodiment of the chain of this invention.

It is also contemplated that a greater number of hooking members may be left in their disconnected position. Thus, in the chain illustrated in FIG. 2, all the members are disconnected between two adjacent sliders, except at least one or two hooking members adjacent to the narrow end 6 of one of such sliders. In practice, the only hooking members that are in interlocked condition are those which are enclosed in the sliders proper, that is, in the narrow portion 6 thereof, as is shown more clearly in FIG. 3 of the drawings.

The chain of this invention may be manufactured very readily from a pair of tapes 3, 4 carrying two series of hooking members 1 and 2. Thus, the chain may be made by simply engaging the several sliders 5, 5a, 5b, with one end of the two series of hooking members, and with such sliders so disposed that they are all oriented in the same direction, and then moving the sliders to different points along the chain. The sliders may be spaced regularly on the chain or at irregular intervals thereon.

If the chain is made with the view of subsequently providing slide fasteners having all substantially the same length, for example for equipping mass-produced clothing, knitwear, hosiery or other articles, the sliders are spaced at regular intervals corresponding to the desired length of the slide fasteners for such purpose. From such a chain the desired fasteners can be obtained by simply cutting the chain intermediate two adjacent sliders.

Figure 4:
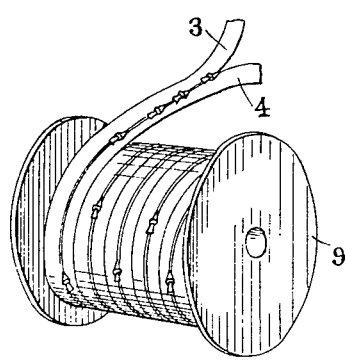
FIG. 4 shows the chain of this invention wound on a spool.

On the other hand, the sliders may be disposed on the chain so as to form separate groups at any desired locations along the chain (see FIG. 4). This arrangement is particularly advantageous for utilizing the chain of this invention for sale in small-ware retail shops so that the customers may buy zip fasteners of any desired lengths. When a section of chain suitable for a fastener is to be cut from such stock rolled or wound on a spool, the first slider of the outermost group is moved to a point substantially intermediate the length of the chain section to be cut. The slide fastener to be formed from such cut section is readily completed by fitting at either end of the chain section thus cut a suitable stop element, for example a staple. Thus, a retail haberdasher may deliver complete slide fasteners having exactly the desired length from a length of the standard chain of this invention.

FIG. 4 also shows that the improved zip fastener of this invention can be transported, handled, set aside and used, for example during the manufacture of clothing or other articles, in the form of a roll wound on a spool 9 from which the chain with its sliders may be unwound as it is required.

Another method of forming a chain embodying the invention is illustrated in FIGS. 6 and 7 of the drawings. In the practice of this method the two series of hooking members carried by the supporting tapes are interlocked throughout the lengths of such series either after or during the manufacture of these hooking members, or as they are secured on the tapes. In the completely closed strip thus obtained a series of successive openings 15 are formed at the positions where it is desired to locate the sliders in the chain by making definite folds in the chain at such positions where the openings are to be formed so that the interengaged fastener elements 1 and 2 thereat may be enabled to readily separate from each other and then exerting a lateral tractive effort at each of such folds by pulling laterally and in opposite directions on the chain so as to separate the hooking members 1 and 2 from each other. At each of the openings thus formed, a control slider of specific type is placed. Each slider comprises two separate portions 16a, 16b each forming one side of the slider. One portion, that is, the inner side portion 16a, carries the projection 17 by which the hooking members are to be separated from each other. The other portion, that is, the outer side portion 16b, carries lateral marginal portions 18 adapted to enclose the hooking members 1, 2, and the pull tab of the slider. In fitting the slider into position on the chain, its inner side portion 16 is presented under the rear face of one of the openings 15, then the outer side portion 16b of the slider is positioned on the inner side portion thereof from the front face of the opening, and finally these two portions 16a, 16b are pressed against each other to bring them into interlocked relation. Preferably suitable interlocking means are provided to this end, for example, in the form of studs (not shown) projecting from the inner face of the outer side portion 16b and engageable in corresponding holes 20 formed in the inner face of the projection 17.

It may be noted that the two side portions of the slider are positioned at one end of the opening 15 formed in the continuous strip. In fact, when fitting the inner side or rear portion 16a of the slider into the opening, the narrower end of the slider should be registered with hooking members of the slideway which have not been separated. This should also be done in applying the outer side portion 16b to slider portion 16a. When thus fitting a slider composed of two separable portions the slider itself is not used for assembling the hooking members of the slideways and the slideways proper.

It is only necessary to mount the two portions of the slider on either end of the limit between the separated hooking members and the assembled hooking members, so that the slider will then be in its normal operative position and conditions.

With this method continuous slideway strips of very great lengths can be produced without difficulty since the slider may be introduced afterwards at any desired location therealong. Of course, this method can be practiced using any known type of slider composed of two separable portions.

As previously indicated, a further purpose of this invention is to provide a method for securing a slide fastener consisting of a section of the chain described hereinabove on hosiery, knitwear, clothing and other articles. In accordance with this method (see FIG. 8), the supporting tapes 3 and 4 of a chain section of any desired length are secured along the edges 21 of the opening in the article 22 that are to be provided with the slide fastener, in any suitable manner as by utilizing a sewing machine having its presser foot 23 equipped with two needles 24, or by sewing the tapes successively by the use of a single-needle sewing machine of conventional type. Then the next slider 5c is caused to be slid along the chain section secured by sewing, and this section is cut off. Finally, stop means, for example, in the form of stitches extending transversely to the hooking members 1 and 2 and supporting tapes 3 and 4, are applied at both ends of the sewn section provided with its slider, provided however, that the needle of the sewing machine can pass without difficulty through the hooking members, as when such members are constituted of plastic material.

Figure 5:
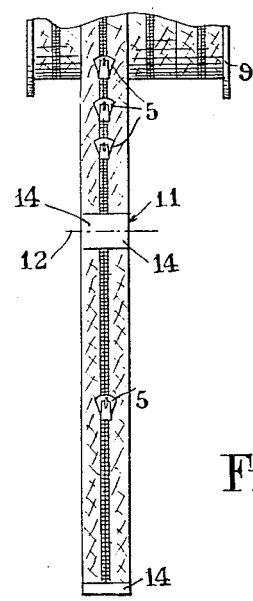
FIG. 5 shows one method of unwinding the chain from a spool for a specific application.

Another method of securing or utilizing a chain section according to this invention is shown in FIG. 5 of the drawings. In this method, the chain is paid off from the spool 9 and a stop member 11 is secured at the proposed cutoff point after a slider 5 has been moved along into the section to be cut. This stop member 11 may consist for example of adhesive tape and is preferably so applied as to overlie the trasnverse line 12 along which the section is to be cut. After the cutting step one portion 14 of the stop member 11 adheres on the cut section, and another portion 14 remains on the chain. Thus, the section to be cut is already provided with a lower stop member as also shown in FIG. 5.

Instead of applying the stop member 11 at the place of cutoff 12 as shown in FIG. 5, the end of the chain to be applied to the garment may be completely closed and the stop member may be placed across the lower end of the closed section of the chain which is laid on the sides of the garment opening and then the chain section and stop member are both attached to the garment by two parallel seams, as indicated in FIG. 8, extending from a point below the stop member to the top of the garment opening. Transverse lines of stitching may then be applied across the chain section below the stop member. Thus the stop member will bear the strain and ease the stress on the cross seam. This method of attaching the section and the stop member is a simple sewing operation and can be performed as one single operation. In completing the attachment of the fastener section so initially applied, two sliders may be moved down into the sewn end section of the chain and then the upper one of these sliders is moved out beyond the garment opening so that the sewn section is closed on both sides of the remaining slider. The upper end of the sewn section is then cut to sever such section from the chain. The upper ends of the two tapes may then be folded or the material of the garment utilized as stops to prevent the remaining slider from coming off, such folds or material being retained in place by suitable stitching.

The chain of this invention also readily adapts itself to application to a garment in which a garment opening is to be cut. In such an operation, a section of chain such as the section below slider 5 in FIG. 2 of the drawings is laid on the garment with the open upper end of such section at an edge of such garment and the remainder of the section extending inwardly at approximately right angles to such edge. Each of the tapes of the section above the slider 5a are then turned over so that the fastener elements are on the outer side of the section and such turned tapes are laid one upon the other. The tapes are then sewed to the garment by two longitudinal lines of stitches located adjacent to the fastener elements and between the latter and the other longitudinal edges of the tapes. The garment is then cut between the two lines of stitches and at the end of such longitudinal cut a little dart is cut. The slider 5a is then pulled up to the edge of the garment and the section is severed from the chain so that the ends of the severed section extend beyond the edge of the garment. These projecting ends are turned in and sewed to form top stops for the slider 5a. A crossseam is stitched across the bottom of the section in the region of the little dart to form a bottom stop. The bottom stop may be strengthened by sewing a stop member 11 in FIG. 5 across the bottom of the chain in the manner above discussed.

It will be understood that in forming the bottom stop member various methods or means may be resorted to, whether permanently or temporarily, for example by using adhesive tapes, staples, weld or sealing spots in the case of rows of plastic hooking members, machine stitchings, etc.

While I have above described and illustrated in the drawings several preferred embodiments of my invention, it will be understood by those skilled in the art that modifications and variations may be resorted to without departing from the spirit and scope of the invention. Such modifications and variations therefore are to be considered as being within the purview and scope of the invention and the scope of the appended claim.

I claim:

A method of manufacturing a chain of relatively great length to constitute stock material adapted to be coiled and from which a plurality of slide fasteners of any desired lengths may be cut off, which chain comprises two coplanar parallel supporting tapes carrying two series of fastener members interlockable with each other and extending continuously along such tapes for a distance at least equal to the combined lengths of the plurality of slide fasteners to be formed therefrom, and a plurality of sliders coupling said tapes together into said stock chain, said method comprising the steps of providing on said tapes throughout their lengths the two continuous series of fastener members in interlocked relation, making definite folds in the chain at those positions where openings are to be formed for the mounting of sliders, exerting a lateral tractive force at each of such folds by pulling laterally and in opposite directions on the chain so as to separate the fastener members from each other and form an opening in the chain, and then mounting a slider on the chain at each of said openings by positioning one half of the slider on each side of the chain at the associated opening bringing such halves together into operative relation with the narrower ends thereof registered with the fastener members, and securing said slider halves together in operative relation, so that each of such sliders is positioned in unconfined relation on said chain so as to be freely movable on said series in one direction or the other through distances substantially greater than the length of the cut slide fastener with which it will be associated, whereby said sliders in the uncoiled condition of said chain are adjustable on said chain to enable the latter to be cut into slide fasteners of varying lengths, each length having one slider between the cut ends and adapted to be completed by end stops assembled and secured thereto.

References Cited by the Examiner

UNITED STATES PATENTS

| | | | |
|---|---|---|---|
| 2,486,401 | 11/1949 | Gerstman | 24—205.15 |
| 2,526,653 | 10/1950 | Gerstman | 24—205.15 |
| 2,623,214 | 12/1952 | Yaffe | 2—265 |
| 2,640,255 | 6/1953 | Morrow | 29—408 |
| 2,775,027 | 12/1956 | Morin | 29—408 |
| 2,879,588 | 3/1959 | Morin | 29—408 |
| 2,972,751 | 2/1961 | Leonard et al. | 2—265 |

WHITMORE A. WILTZ, *Primary Examiner.*

JORDAN FRANKLIN, THOMAS H. EAGER,
*Examiners.*